United States Patent [19]
Hori

[11] Patent Number: 5,380,076
[45] Date of Patent: Jan. 10, 1995

[54] RUBBER CRAWLER BELT OF A TRACKED VEHICLE

[75] Inventor: Kazutoshi Hori, Komatsu, Japan

[73] Assignee: Kabushiki Kaisha Komatsu Seisakusho, Tokyo, Japan

[21] Appl. No.: 920,306

[22] PCT Filed: Feb. 13, 1991

[86] PCT No.: PCT/JP91/00169

§ 371 Date: Aug. 12, 1992

§ 102(e) Date: Aug. 12, 1992

[87] PCT Pub. No.: WO91/12165

PCT Pub. Date: Aug. 22, 1991

[30] Foreign Application Priority Data

| Feb. 14, 1990 | [JP] | Japan | 2-33371 |
| Feb. 14, 1990 | [JP] | Japan | 2-33372 |
| Feb. 14, 1990 | [JP] | Japan | 2-33373 |
| Feb. 27, 1990 | [JP] | Japan | 2-47002 |

[51] Int. Cl.⁶ ............................ B62D 55/24
[52] U.S. Cl. .................... 305/38; 305/35 EB; 305/56
[58] Field of Search ............ 305/35 R, 35 EB, 38, 305/39

[56] References Cited

FOREIGN PATENT DOCUMENTS

| 46-18170 | 5/1971 | Japan . | |
| 47-19051 | 6/1972 | Japan . | |
| 49-20229 | 2/1974 | Japan . | |
| 0002923 | 1/1977 | Japan | 305/35 EB |
| 53-20102 | 5/1978 | Japan . | |
| 53-113537 | 9/1978 | Japan . | |
| 55-72469 | 5/1980 | Japan . | |
| 0087669 | 7/1980 | Japan | 305/38 |
| 0087671 | 7/1980 | Japan | 305/38 |
| 0140662 | 11/1980 | Japan | 305/38 |
| 0095269 | 6/1982 | Japan | 305/35 EB |
| 57-126766 | 8/1982 | Japan . | |
| 58-93579 | 6/1983 | Japan . | |
| 58-100185 | 7/1983 | Japan . | |
| 60-1082 | 1/1985 | Japan . | |
| 62-71764 | 4/1987 | Japan . | |
| 0049590 | 3/1988 | Japan | 305/39 |
| 0266080 | 10/1989 | Japan | 305/35 R |
| 5039066 | 2/1993 | Japan | 305/38 |

Primary Examiner—Russell D. Stormer
Attorney, Agent, or Firm—Richards, Medlock & Andrews

[57] ABSTRACT

The rubber crawler belt, employed in a tracked vehicle such as a construction machine, is a short pitch crawler belt which reduces the level of vibrations and noise caused during travelling of the vehicle, increases tractive power and rigidity of the crawler belt, and reduces bending strain of the crawler belt and abrasion of the lug. A rubber crawler belt has a construction wherein core members (1) are embedded in the rubber crawler belt and arranged so as to engage serially with every tooth of a drive wheel. Each core member has an engaging portion (2) for engaging with the drive wheel and which is provided in a widthwise central portion of the core member. Each of the right and left sides of the engaging portion is continuously provided with a guide projection (3), a rolling rail surface (4) and a wing portion (5). The front-rear directional dimension of the engaging portion A and the front-rear directional dimension of the wing portions are approximately the same. Further, engaging holes (9) for engaging with the drive wheel are formed between neighboring core members (1) in a widthwise central portion of the rubber crawler belt, and a lug is formed on the ground contact surface of the rubber crawler belt so as to extend across both the right and left side portions of the projection planes of a plurality of adjacent core members and gaps between the adjacent core members.

17 Claims, 5 Drawing Sheets

RUBBER CRAWLER BELT OF A TRACKED VEHICLE

TECHNICAL FIELD

The present invention relates to a rubber crawler belt used in a tracked vehicle represented by a construction machine, such as a bulldozer or a hydraulic excavator, and more particularly, to a core member and a lug pattern of a rubber crawler belt.

BACKGROUND ART

Conventionally, a tracked vehicle represented by a construction machine, such as a bulldozer and a hydraulic excavator, is driven by iron crawler belts rotated by power transmitted through drive wheels. The iron crawler belts are supported by the drive wheels, free wheels and upper and lower rollers provided between the drive and free wheels. Recently, rubber crawler belts also have been used instead of iron crawler belts in order to reduce noise and vibrations coming from the crawler belts and wheels. The rubber crawler belts are formed by equidistantly embedding metallic core members in endless rubber belts. The rubber crawler belts are driven by the engagement between the core members and the teeth of the drive wheels.

Generally, an iron crawler belt engages with every other tooth of an odd number of teeth of a drive wheel. Therefore, the teeth which engage with the iron crawler belt shift by one pitch every rotation thereof. In other words, every other tooth comes into engagement during one rotation and the other teeth come in the engagement during the next rotation. Such an every-other-tooth engagement reduces abrasion loss of the teeth of the drive wheel. However, this every-other-tooth engagement results in a large link pitch of the crawler belts in a large vehicle. When such a crawler belt is wound on the drive wheel and the free wheel, a large bending angle results between neighboring links and, thus, the crawler belt forms a polygonal shape. Thus, there is a problem that the impact of the links to the drive and free wheels becomes great and causes substantial noise and vibrations.

Such a problem is also found in a rubber crawler belt. In addition to that, a large bending angle of a rubber crawler belt wound on the drive and free wheels produces a large strain in the lugs provided on the ground contact surface of the rubber crawler belt and may result in a crack in a lug. Thus, durability of the rubber crawler belt decreases.

It has been believed that as in the case of an iron crawler belt, a single tooth of the drive wheel transmits more than a half of the entire driving force to a rubber crawler belt. Therefore, since the rubber and the core members must be adhered firmly, the area of right and left wing portions of a core member is made large to provide sufficient adhesion strength. As a result, the front-rear directional dimension of the wing portions of a core member becomes larger than the interval between the tips of the teeth, and, hence, makes it impossible to arrange core members so as to leave gaps therebetween which enable the teeth of a drive wheel to serially engage with the core members. Inevitably, a rubber crawler belt is formed which has a large double pitch for every-other-tooth engagement. Since such a rubber crawler belt has large gaps between rolling rail surfaces formed on the core members, lower rollers fall into the gaps during travelling of the vehicle and, thus, cause driving vibrations.

A rubber crawler belt of a short pitch may be formed which engages with every tooth of a drive wheel instead of every other tooth. However, there is another requirement that a large ground contact area of the lugs of a rubber crawler belt be provided in order to obtain low lug surface pressure, i.e., to provide sufficient abrasive service life of the lugs. Therefore, if one lug is provided for one core member in such a short pitch rubber crawler belt, freedom with respect to the shape of the lug decreases, and a large sheered area of soil cannot be obtained, resulting in reduced tractive power.

Further, because grooves are formed as bending portions between the core members, lower rollers are not firmly supported by portions between the core members. Therefore, there is a problem that during travelling of the vehicle, the lower rollers fall in between the core members and, hence, inevitably cause vibrations.

When a rubber crawler belt is wound and bent on a drive wheel and a free wheel, grooves formed between the core members are substantially distorted since rigidity of the grooves is low. Therefore, flapping of the crawler belt and bumping noise are likely to result.

Since lugs are separately provided for the individual core members, the lugs clutch into the ground intermittently, thus increasing vibratory force of the crawler belt.

There is a short pitch rubber crawler belt comprising right and left side lugs which substantially cover the projection planes of the right and left wing portions, respectively, of two neighboring core members, and which are shifted by one pitch from each other. However, because gaps between the lugs of both right and left sides exist between core members and the gaps between the lugs of one side are shifted by one pitch from the gaps between the lugs of the other side, rigidity of rubber portions between the core members significantly differs between the right side and the left side. When this rubber crawler belt is wound and bent on a drive wheel and a free wheel, the crawler belt may be twisted and break at a gap. In addition, there is a problem in that the lower roller which has come between core members falls toward the gap between lugs.

The present invention is intended to solve the above problems of the conventional art. It is an object of the present invention to provide a short pitch rubber crawler belt of a tracked vehicle which engages with every tooth of the drive wheel, reduces noise and vibrations caused during travelling of the vehicle, increases rigidity of the crawler belt and tractive power, and reduces the bending strain of the crawler belt and the abrasion of lugs.

SUMMARY OF THE INVENTION

According to the first aspect of the present invention, core members are embedded in the rubber crawler belt and arranged so as to engage serially with every tooth of a drive wheel, and each of the core members has an engaging portion for engaging with the drive wheel and which is provided in a widthwise central portion of the core member, and each of the right and left sides of the engaging portion is continuously provided with a guide projection, a rolling rail surface and a wing portion, and the front-rear directional dimension of the engaging portion A and the front-rear directional dimension of the wing portions are approximately the same The position of the guide projection and rolling rail surface in the left side in the core member and the position of the guide projection and rolling rail surface in the right side may be offset from each other in the front-rear directions.

In the above structure, since the front-rear directional dimension of each portion of the core members becomes equal to or smaller than the distance between the tips of the teeth of a drive wheel, the core members will engage sequentially with every tooth of the drive wheel. Thereby, the bend angle of the rubber crawler belt positioned around the drive wheel and the guide wheel is reduced to approximately ½ of the bend angle of a rubber crawler belt engaged with every other tooth. As a result, bumping noise and flapping of the crawler belt caused during travelling of the vehicle is significantly reduced. Further, because the bend angle of the rubber crawler belt is reduced, a lug formed on the ground contact side and extending over a plurality of core members will not increase bending strain of the rubber. Therefore, freedom of the shape of the lug will be increased.

The above improvements are based on the results obtained by measuring driving force distribution over the rubber crawler belt. The results show that driving force is transmitted from the drive wheel to the rubber crawler belt through all the teeth being engaged, though the amounts of force transmitted through these teeth are not the same. Therefore, core members smaller than those in the conventional art can bear such driving force transmitted from the drive wheel though, in general, a smaller member provides a smaller adhesion strength. When core members having smaller areas for adhesion to the rubber are employed, the resulting weak resistance against a breaking away load must be offset by providing core lines over and under the core members. Thus, the adhesion strength between the core members and the rubber is enhanced, and rigidity of the rubber crawler belt is increased.

According to the second aspect of the present invention, a rubber crawler belt has a basic construction, wherein core members are embedded in the rubber crawler belt and arranged so as to engage serially with every tooth of a drive wheel, and engaging holes for engaging with the drive wheel are formed between neighboring core members and in a widthwise central portion of the rubber crawler belt, and lugs are formed on the ground contact surface of the rubber crawler belt so that there is at least one lug in each of the right and left portions of the projection plane of the core members, so that each of such lugs extends across the projection planes of a plurality of adjacent core members and gaps between the adjacent core members, and so that each gap portion between neighboring core members is crossed by such lugs at one or more locations in each of the right and left portions of the gap portion. In addition to such a construction, a portion of the lug may be formed as a plane extending all around the rubber crawler belt.

On the above construction, a lug pattern is formed wherein a lug is composed of a central portion with respect to the width of the rubber crawler belt and branch portions extending from the central portion diagonally backwardly toward the right and left edges, and wherein the branch portions cross each other at the central portion. In a modification of this lug pattern, a lug has a shape formed between two arcs having their centers in a widthwise central portion of the rubber crawler belt. In another modification, belt-like lugs extending in the belt winding directions are formed along the right and left edges and between the widthwise central portion and both edges, and the inner lugs are shifted by one pitch of the core members from the right and left edge lugs. In still another modification, a lug is composed of a central portion with respect to the width of the rubber crawler belt and right and left branch portions extending from the central portion diagonally toward an upper right edge portion and a lower left edge portion, respectively, and the right and left portions are parallel to each other.

Further, a lug may be formed of central portions which are provided between neighboring engaging holes and branch portions, each of which connects two neighboring central portions sandwiching an engaging hole and extends diagonally backwardly toward the right or left edge of the rubber crawler belt. The right and left branch portions are shifted from each other by one pitch of the core members, and the front-rear directional dimension of the lug top surfaces of the branch portions becomes less from the central portion toward the right and left edges of the rubber crawler belt. The lug top surface is formed of the central portions and the branch portions extending therefrom so as to surround each engaging hole on three sides in a "U" shape manner and continuously extend in a zigzag manner. In a modification of this, belt-like lugs are formed in a widthwise central portion and both of the edge portions of the rubber crawler belt so as to continuously extend all around the outer periphery of the rubber crawler belt, and these three lugs parallelly extend in the belt winding directions. In another modification, a lug is formed of a widthwise central portion of a rubber crawler belt and branch portions extending from the central portion diagonally backward toward the right and left edges, and the central portion is formed as a belt continuously extending in the front-rear directions all around the outer periphery of the rubber crawler belt, and the branch portions cross each other at the central portion.

According to the above constructions, freedom with respect to the shape of the core members becomes greater than that in a conventional rubber crawler belt in which one lug is provided for one core member. A lug pattern can be suitably selected according to a desired advantage, such as increased tractive power or prevention of side slip.

In addition, since both the right and left portions between core members provide increased strength for supporting the lower rollers, the falling of the lower rollers into the gaps between core members is reduced. Particularly, a lug having a surface continuously extending all around the rubber crawler belt reduces the falling of the lower rollers into the gaps between core members to a very small amount, and thus significantly reduces the level of vibrations caused during travelling of the vehicle.

Further, enhanced rigidity of the crawler belt substantially prevents the crawler belt from twisting, flapping and going off track. Because the damping force caused by bending portions when the crawler belt is bent is increased, the impact caused by bumping of the crawler belt against the drive wheel and a free wheel is reduced and, hence, the noise caused by the bumping of the crawler belt is reduced.

Particularly, a lug whose branch portions cross each other at the widthwise central portion of the rubber crawler belt and a lug having an arc shape continuously come into contact with the ground during forward travelling of the vehicle, from the central portion to the branch portions. Therefore, the level of vibrations is reduced so that soil gripped between the lugs is not broken. Tractive power is thus increased. Further, since a lug continuously extending along the outer periphery of the rubber crawler belt and a linear lug contribute to linear travelling of the vehicle, such lugs substantially prevent side slip even on a slope or soft ground.

According to the third aspect of the present invention, corresponding to the front-rear directional dimension of the lug top surfaces of the branch portions of the rubber crawler belt becoming less, the front-rear directional dimension of grooves formed between neighboring lug top surfaces becomes greater from the central portion toward the right and left edges of the rubber crawler belt, and slant surfaces are formed between the lug top surface and groove bottom surfaces formed at a predetermined depth from the lug top surface, and the slant surfaces on the front side of the lug are formed as planes in which the slant angle becomes less from the central potion toward the right and left edges, and the slant surfaces on the rear side of the lug are formed as planes having a consistent slant angle from the central portion to the right and left edges.

With such a construction, a large sheering area of soil can be obtained. Since the groove slant surface provided on the front side of the lug is formed so that the slant angle becomes gradually less toward the right and left edges of the rubber crawler belt, the width of this slant surface becomes greater toward the right and left edges of the rubber crawler belt. More particularly, a surface portion closer to the edges is expanded toward the bottom and sides of the rubber crawler belt. The area in which pressure is caused by the driving force of the vehicle is increased and tractive power is increased. When the rubber crawler belt slips, the soil in the grooves is forced out downwardly and outwardly and is thus easily released.

According to the fourth aspect of the present invention, many steel or synthetic resin core lines are buried close to the lower surface of the core members and the upper surfaces of the right and left wing portions in the rubber crawler belt so as to extend all through the rubber belt.

In such a construction, adhesion strength between the core members and the rubber crawler belt is enhanced, and the amount of tilting of the core members caused by a lower roller rolling between the core members is reduced. As a result, the amount of falling of the lower roller into gaps between the core members during travelling of the vehicle is significantly reduced.

According to the fifth aspect of the present invention, a rubber crawler belt is formed with a preset angle provided so that the rolling rail surfaces of neighboring core members will bend toward the roller-rolling side.

In such a construction, since double waving of portions between the core members of the rubber crawler belt becomes substantially single waving, flapping of the rubber crawler belt is substantially prevented.

A construction according to the sixth aspect of the present invention includes: the above third construction based on the above second construction; the first construction wherein the front-rear directional dimension B of the wing portions provided on the right and left outer portions of the core members is approximately equal to the front-rear directional dimension A of the engaging portion; the fourth construction wherein many core lines are buried close to the lower surface of the core members and the upper surfaces of the right and left wing portions in the rubber crawler belt so as to extend in the front-rear directions; and the fifth construction wherein the rubber crawler belt is provided with a preset angle so that the rolling rail surfaces of neighboring core members will bend toward the roller-rolling side.

The above construction provides advantages provided by the first to fifth constructions.

THE BEST MODE FOR CARRYING OUT THE INVENTION

The first embodiment of the rubber crawler belt of a tracked vehicle according to the present invention will be described with reference to the drawings.

Figure 1:
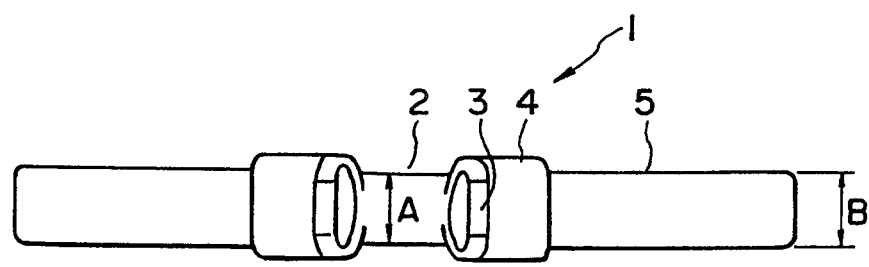
FIG. 1 is a plan view of a core member of a rubber crawler belt according to the first embodiment of the present invention, viewed from the side on which a roller turns.
Figure 2:
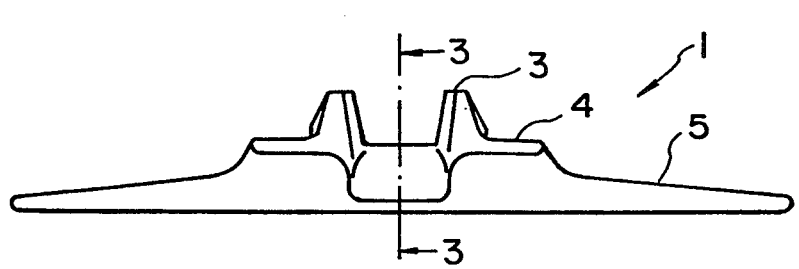
FIG. 2 is a front view of the core member shown in FIG. 1.
Figure 3:
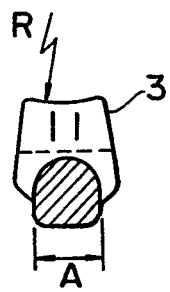
FIG. 3 is a sectional view taken along the line 3—3 of FIG. 2.

Referring to FIGS. 1 to 3, a core member 1 has an engaging portion 2 formed at a center portion thereof with respect to the width so as to engage with a drive wheel, which is used for both a rubber crawler belt and an iron crawler belt. The engaging portion 2 has a semi-circular to shape and a dimension A in front-rear directions which is shorter than the distance between the tips of the teeth of the drive wheel. Since the engaging portion 2 slidingly contacts the teeth of the drive wheel, the engaging portion 2 has a hardened surface. Guide projections 3 are provided on both side of the engaging portion 2. The guide projections 3 guide the rubber crawler belt so that the rubber crawler belt stays on the rolling plane of rollers. As shown in FIG. 3, the top surface of a guide projection 3 is formed in the shape of arc having a radius equal to or slightly smaller than the rolling radius R of the guiding rollers so as to contact the circumference of each roller by plane contact or two-line contact. A rolling rail surface 4 for lower rollers is formed on the outer side of a base portion of each guide projection 3. Wing portions 5 extend outwardly from the rolling rail surfaces 4. The wing portions 5 have a front-rear directional dimension B which is smaller than the distance between the tips of the teeth of the drive wheel and approximately equal to the dimension A of the bottom portion of the engaging portion 3, $$A \approx B,$$

Figure 4:
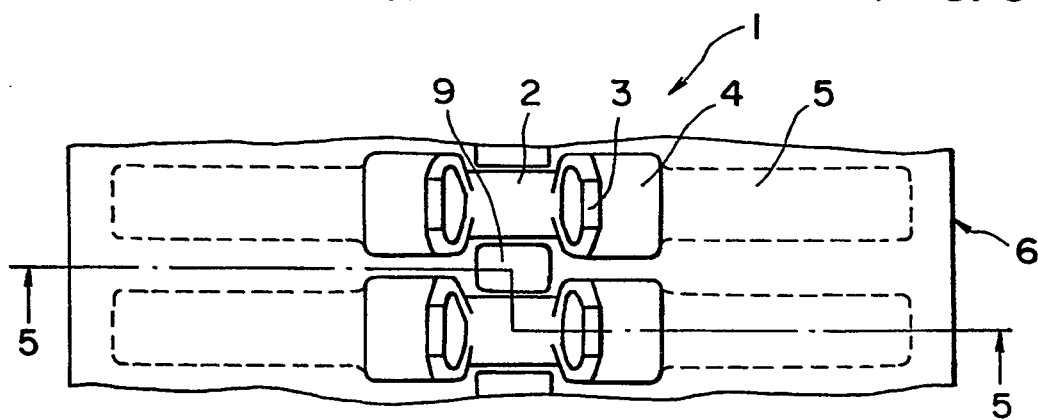
FIG. 4 is a partial plan view of a rubber crawler belt taken from the side on which a roller turns.
Figure 5:
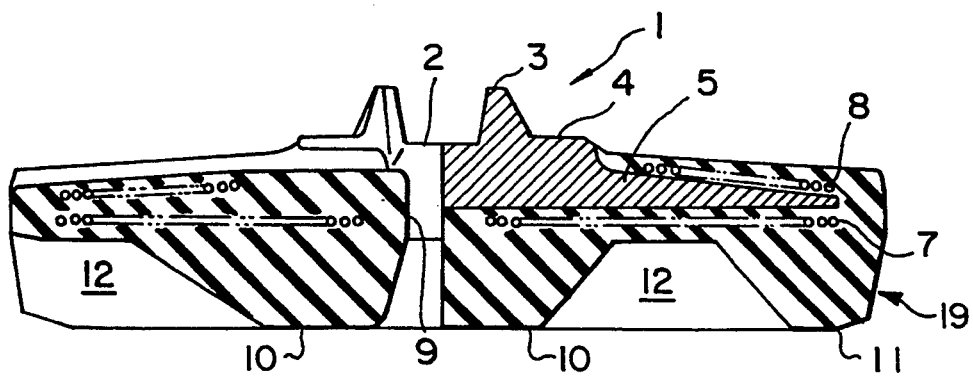
FIG. 5 is a sectional view taken along the line 4—4 of FIG. 4.

As shown in FIGS. 4 and 5, the engaging portion 2, the guide projections 3 and the rolling rail surfaces 4 of the core member 1 lie bare and the rest is buried in the rubber crawler belt 6. The outer portion of the rubber crawler belt 6 is provided with lugs 19 for gripping the soil, with each lug 19 comprising a central portion 10 and branch portions 11. A groove 12 is formed between each adjacent pair of lugs 19.

Figure 6A:
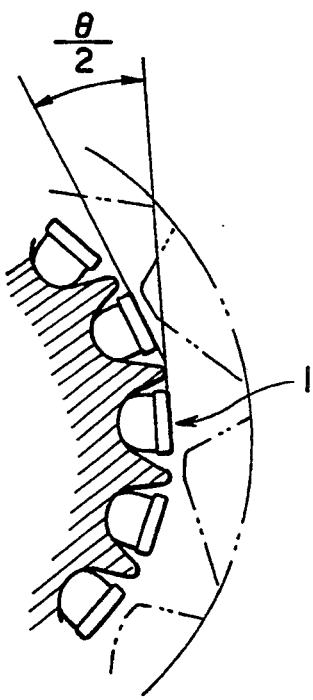
FIG. 6(a) is a partial side view illustrating engagement between a drive wheel and a rubber crawler belt in which core members are embedded.
Figure 6B:
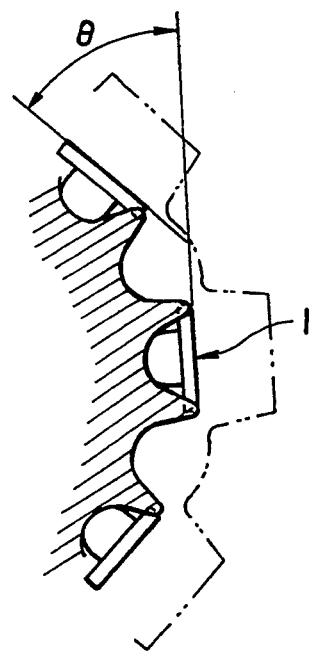
FIG. 6(b) is a partial side view illustrating engagement between a drive wheel and a rubber crawler belt according to the conventional art.

To embed such core members 1 in a rubber belt 6, the core members 1 are arranged so that the distance between the axis of an engaging portion 2 and the axis of a neighboring engaging portion 2 will be equal to one pitch, which is the distance between the center dividing a tooth bottom portion of the drive gear into two equal parts along the circumference and the center of the neighboring tooth bottom portion. Thus, the core members 1 are arranged so that the distance between the core members 1 is equal to or less than the distance between the tips of the teeth of the drive gear and every tooth engages with a core member 1, as shown in FIG. 6(a). The bend angle θ/2 of the rubber crawler belt as shown in FIG. 6(a) is substantially one half of the bend angle θ of the conventional rubber crawler belt as shown in FIG. 6(b), wherein there is only every-other-tooth-engagement. The rolling rail surfaces 4 of neighboring core members 1 are close to each other so that sinking of the lower rollers is reduced and, as a result, noise during driving is reduced.

Figure 7A:
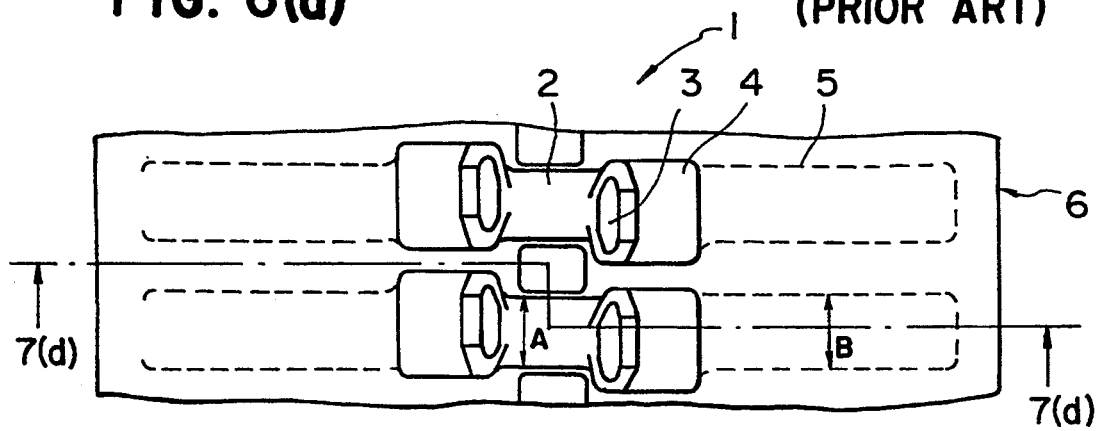
FIG. 7(a) is a partial plan view of a rubber crawler belt in which core members according to a modification of the first embodiment are embedded, taken from the side on which a roller turns, according to a modification of the first embodiment.

FIG. 7(a) illustrates a core member 1 according to a modification of the first embodiment. To further reduce vibration and noise during driving, the core member is modified as follows. Left side guide projection 3 and rolling rail surface 4 and right side guide projection 3 and rolling rail surface 4 are offset from each other in the front-rear directions with respect to the axis of an engaging portion 2, which engages with a drive wheel. Therefore, a major portion of a roller remains in contact with either the left or right rolling rail 4 and the roller hardly falls in a gap between the rolling rail surfaces 4 even while the roller is rolling between core members 1. As a result, the vibration and noise caused during driving is further reduced. The widthwise center line of right and left wing portions 5 coincides with the axis of the engaging portion 2. Though a drive wheel for an iron crawler belt is used for a rubber crawler belt according to this embodiment, such a feature is not restrictive.

The first embodiment has the following advantages:

(1) Because the gap between neighboring core members 1 is reduced, falling of the lower rollers from the rolling surface is reduced. The front-rear directional dimension of the rolling rail surfaces 4 of each core member 1 is reduced, the core members 1 do not substantially tilt and if they do tilt, the falling of the lower rollers is minor. Thus, the amount of vibrations reaching the operator or the ground is substantially reduced.

(2) Because the pitch of the core members 1 is reduced, the bend angle of the crawler belt 6 positioned around the drive wheel and the guiding wheel is reduced to approximately ½ of the bend angle of the conventional crawler belt, the energy caused by bumping between the crawler belt and the drive and guide wheels is reduced. As a result, bumping noise is reduced and flapping of the crawler belt is significantly reduced. Further, because the bend angle of the crawler belt is reduced, bending strain is reduced and, as a result, durability of the rubber crawler belt 6 is enhanced.

(3) Because the gap between neighboring core members 1 is narrowed, i.e., because a portion of the crawler belt 6 formed only of a rubber layer is narrowed, movement of each core member 1 is restricted and rigidity of the crawler belt 6 is increased. Thus, off-tracking of the crawler belt 6 is substantially prevented.

(4) Because the vibration of the crawler belt 6 is reduced, the driving force is effectively transmitted to the ground without breaking clods of soil gripped in grooves 12 of lugs 19. Tractive power is thus increased.

(5) Because reduced vibration of the crawler belt 6 and increased tractive power will reduce the incidence of slipping of the crawler belt, abrasion of the lug 19 is reduced and durability of the rubber crawler belt 6 is improved.

(6) Because there is no need to change drive wheels when iron crawler belts are replaced with the rubber crawler belts 6, it is easy to change crawler belts.

Next, the second embodiment and its modifications according to the present invention will be described in detail with reference to the drawings. In FIGS. 8 to 14, top surfaces of lugs of rubber crawler belts are shaded to help understand the illustrations.

Figure 8A:
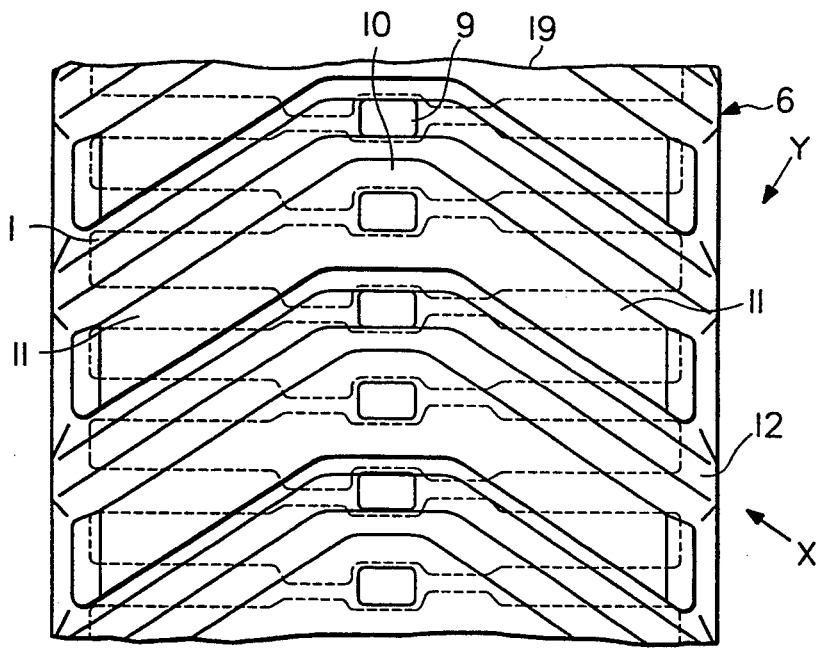
FIG. 8(a) is a partial plan view of a rubber crawler belt according to the second embodiment of the present invention and taken from the ground contact side.

FIG. 8(a) is a partial plan view of a lug pattern of a rubber crawler belt 6 according to the second embodiment. The rubber crawler belt 6 has core members 1 embedded and arranged therein so that each core member 1 engages with each tooth of a drive wheel. Widthwise center portions between neighboring core members 1 are provided with engaging holes 9 which engage with the drive wheel. When an engaging portion 2 of a core member 1 engages with a tooth of the drive wheel, the tooth tip does not substantially strike any portion but enters the engaging hole 9.

A lug 19 formed on the ground contact surface of the rubber crawler belt 6 is formed of a central portion 10 and branch portions 11 extending diagonally backward to the right and left edges from the central portion 10. The branch portions 11 of each lug 19 are formed so as to cross each other in the central portion 10 and extend across the projection planes of three adjacent core members 1. Further, the branch portions 11 are formed so as to cross a gap portion between neighboring core members 1 in at least one location in the widthwise right and left sides, respectively. Thus, the right and left sides of each core member 1 are evenly supported by lugs 19. Further, since the rolling rail surfaces 4 are offset from each other in the front-rear directions, falling of the rollers into gaps between the core members 1 is extremely small.

The central portion 10 of a lug 19 is disposed at every other engaging hole 9. Grooves 12 are formed between neighboring lugs 19. When the vehicle is going forward, the central portion 10 of a lug 19 first comes into contact with the ground followed by the branch portions 11, and during this process, the next lug 19 comes into contact with the ground. Thus, the lugs 19 are continuously in contact with the ground.

According to the conventional art, since only one lug is provided for one core member, the lugs intermittently grip into the ground and, as a result, the crawler belts vibrate substantially. Such a problem is substantially eliminated according to the present invention.

Figure 8C:
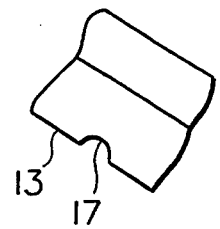
FIG. 8(c) is a view taken in the direction indicated by the arrow Y of FIG. 8(a)
Figure 8B:
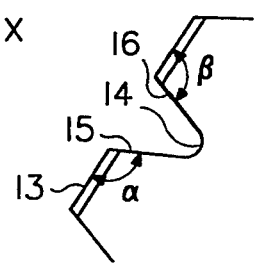
FIG. 8(b) is a view taken in the direction indicated by the arrow X of FIG. 8(a)

As shown in FIG. 8(b), slant surfaces 15 and 16, extending between a lug top surface 13 and a bottom surface of a groove 12, are so formed that the angle $\alpha$ between the lug top surface 13 and a lug's front side slant surface 15 is larger than the angle $\beta$ between the lug top surface 13 and a lug's rear side slant surface 16. Therefore, a force is generated which pushes a sheered soil clod rearwardly and downwardly. If there is a possibility that durability may become insufficient because rubber strain is increased by changing the shapes of the core members 1, the rubber materials or the height of the lug top surfaces 13 from the bottom surfaces of the grooves 12, the crawler belt 6 may be formed with a preset angle provided. Further, as shown in FIG. 8(c), a smallest possible recess portion 17 may be formed in a portion of a lug top surface 13.

Figure 9:
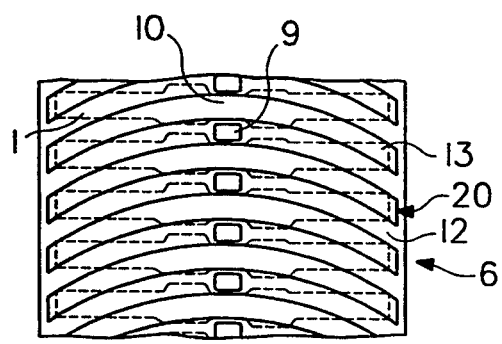
FIGS. 9 to 11 are views of rubber crawler belts taken from the ground contact side and illustrating lug patterns according to modifications of the second embodiment.

FIG. 9 is a partial plan view of a rubber crawler belt according to a modification of the second embodiment. Each lug 20 has a shape formed between two arcs having the centers in a widthwise center portion of the crawler belt. The two arcs have different centers and radii so that the front-rear directional dimension of the lug is greatest at its center portion and becomes less toward the left and right edges. A widthwise central portion of the rubber crawler belt 6 is provided with engaging holes 9, which receive the tips of the teeth of a drive wheel without bumping on them when engaging with the drive wheel. Central portions 10 of the lugs 20 are located between the engaging holes 9. Grooves 12 are formed between neighboring lugs 20. Each lug 20 extends over two core members 1. As in the above described second embodiment, slant surfaces are formed between lug top surfaces 13 and the bottom of grooves 12 so that the angle between the top surface 13 and the front side slant surface 15 of a lug 20 is greater than the angle between the top surface 13 and the rear side slant surface 16 of the lug 20.

Figure 10:
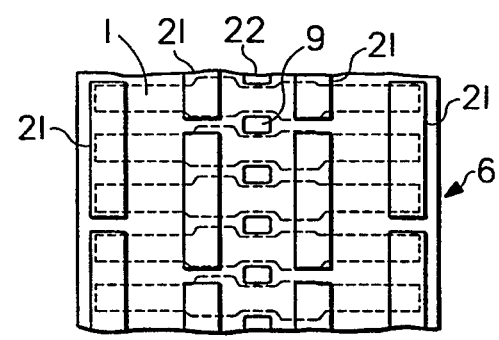

FIG. 10 is also a partial plan view of a rubber crawler belt according to a modification of the second embodiment. Belt-like lugs 21 extending in front-rear directions are provided between the right and left edges of a rubber crawler belt 6 and the right and left ends of a widthwise central portion 22. These lugs 21 are arranged in four rows extending in the front-rear directions. Each lug 21 extends over three core members 1. The lugs 21 in the inner two rows are shifted by one pitch from the lugs 21 in the right and left edge rows.

Figure 11:
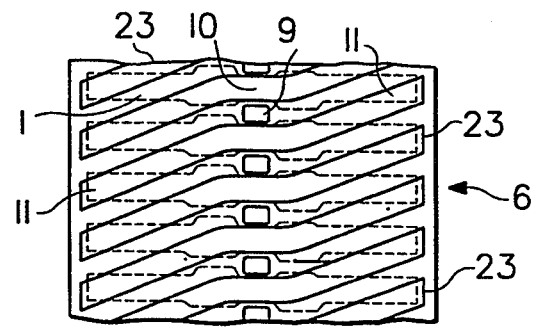

FIG. 11 is a partial plan view of a rubber crawler belt according to a modification of the second embodiment. Each lug 23 is formed of a central portion 10 with respect to the width of a rubber crawler belt 6, a first branch portion 11 extending from the central portion 10 diagonally upwardly toward the right a second branch position 11 extending from the central portion and diagonally downwardly toward the left. The central portions 10 are located between engaging holes 9, which receive the tips of the teeth of a drive wheel without bumping them when engaging with the drive wheel. The right and left branch portions 11 are parallel to each other. Each 23 lug extends over three core members 1.

Figure 12A:
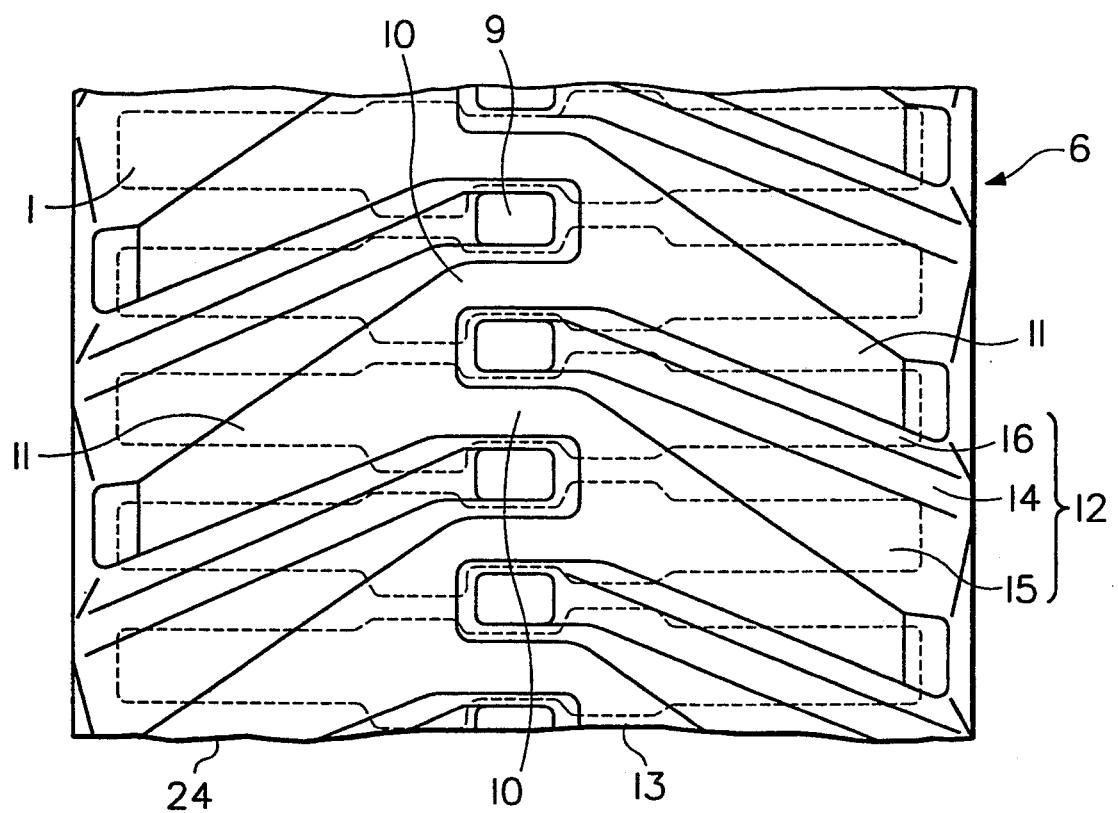
FIG. 12(a) is a partial plan view of a rubber crawler belt according to still another modification of the second embodiment and taken from the ground contact side.

FIG. 12(a) is a partial plan view of a rubber crawler belt according to another modification of the second embodiment. A lug 24 is formed of central portions 10, which are provided between neighboring engaging holes 9, and branch portions 11, with each branch portion 11 connecting two neighboring central portions 10, sandwiching an engaging hole 9 and extending diagonally backwardly toward the right or left edge of the rubber crawler belt 6.

The right and left branch portions 11 are shifted from each other by one pitch of core members 1. Thus, the right and left branch portions 11 are asymmetric with respect to the widthwise center line of the rubber crawler belt 6. Each branch portion 11 is formed so as to extend diagonally backwardly across the projection planes of three adjacent core members 1. The top surface 13 of the lug 24 is formed of the central portions 10 and the branch portions 11 extending therefrom so as to surround each engaging hole 9 on three sides in a "U" shape and continuously zigzag all around the periphery of the rubber crawler belt 6.

The front-rear directional dimension of the portion of the lug top 13 surface in each branch portion 11 becomes less from the central portion 10 toward the left or right edge. Accordingly, the front-rear directional dimension of each groove 12 becomes greater from the central portion 10 toward the left or right edge.

Figure 13:
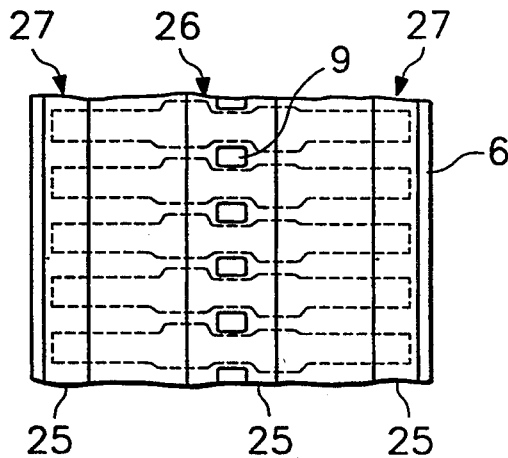
FIGS. 13 to 14 are views of rubber crawler belts, taken from the ground contact side and illustrating lug patterns according to still other modifications of the second embodiment.

FIG. 13 is a partial plan view of a rubber crawler belt according to still another modification of the second embodiment. Lugs 25 are provided in a widthwise central portion 26 and in edge portions 27 of a rubber crawler belt 6 so as to continuously extend all around the outer periphery of the rubber crawler belt 6. These lugs 25 are belts parallelly extending in the front-rear directions. The lug 25 in the central portion 26 is wider than the lugs 25 in the edge portions 27. The lug 25 in the central portion 26 is provided with engaging holes 9 which receive the tips of the teeth of a drive wheel without bumping them when engaging with the drive wheel.

Figure 14:
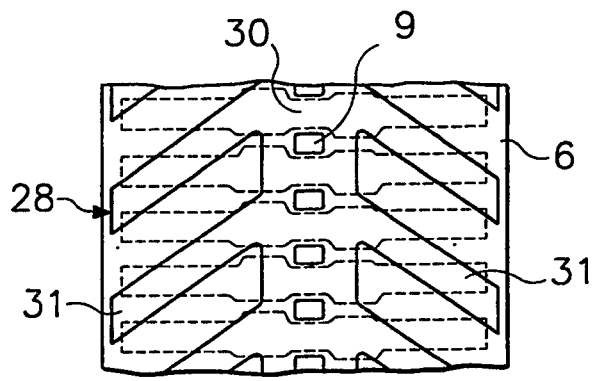

FIG. 14 is a partial plan view of a rubber crawler belt according to a further modification of the second embodiment. A lug 28 is formed of a widthwise central portion 30 of a rubber crawler belt 6 and branch portions 31 extending from the central portion 30 diagonally backwardly toward the right and left edges. The central portion 30 is formed as a belt continuously extending all around the outer periphery of the rubber crawler belt 6. The central portion 30 is provided with engaging holes 9 which receive the tips of the teeth of a drive wheel without bumping them when engaging with the drive wheel.

The lug patterns of the rubber crawler belts 6 shown in FIGS. 8, 9 and 14 have front-rear directional features. Hence, a greater tractive force is obtained when the vehicle goes forward. The lug pattern of the rubber crawler belt 6 shown in FIG. 12 facilitates the release of soil clods gripped in the grooves 12 since the grooves 12 becomes wider toward the left and right edges. The lug patterns of the rubber crawler belts 6 shown in FIGS. 10, 11 and 13 exhibit high resistance against side slip and favorably contribute to linear travelling of the vehicle, though these lug patterns are not very advantageous in tractive power.

Thus, as a principle structure, a rubber crawler belt 6 has core members 1 embedded therein which engage with each tooth of a drive wheel. Further, as a basic structure according to the second embodiment, the rubber crawler belt has lugs which are formed on the ground contact surface. At least one lug is provided in each of the right and left portions of the projection plane of a core member 1, and such a lug extends across the projection planes of a plurality of adjacent core members 1. Each of the widthwise right and left portions of a gap between neighboring core members 1 is crossed by a lug in at least one location. As a result, freedom in the shape of a lug is significantly increased compared with the conventional art, allowing the formation of a lug most suitable for the operational conditions of a given vehicle.

The advantages of the second embodiment and its modifications are as follows:

(1) Because the falling of the rollers into gaps between the core members 1 is reduced, the level of vibrations reaching the operator and the ground is substantially reduced.

(2) Enhanced rigidity of the crawler belt 6 substantially prevents the crawler belt 6 from twisting, flapping and going off track. Because the damping force caused by bending portions when the crawler belt 6 is bent is increased, the impact caused by bumping of the crawler belt 6 against the drive wheel and a free wheel is reduced and, hence, the noise caused by the bumping of the crawler belt is reduced. Further, reduced bending stress of the crawler belt substantially prevents breakage of the rubber crawler belt 6.

(3) Because of above-mentioned reduced vibrations and upgraded shapes of the lug top surfaces 13 and grooves 12, driving force can be effectively transmitted to the ground without breaking the soil clods gripped in the grooves 12. Tractive power is thus increased.

(4) Because reduced vibration of the crawler belt and increased tractive power will reduce the incidence of slipping of the crawler belt, abrasion of the lug is reduced and durability of the rubber crawler belt 6 is improved.

Next, the third embodiment of the present invention will be described in detail with reference to the drawings.

Figure 12B:
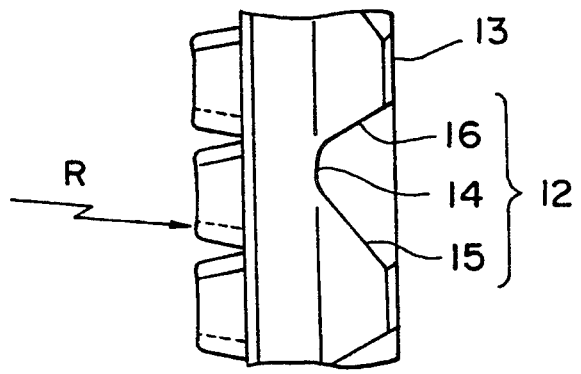
FIG. 12(b) is a partial side view of the rubber crawler belt shown in FIG. 12(a)

Referring to FIGS. 12(a) and 12(b) illustrating a partial side view of the rubber crawler belt 6 shown in FIG. 12(a), the front-rear directional dimension of a lug top 13 surface of each branch portion 11 becomes less from a central portion 10 of the rubber crawler belt 6 toward the left or right edge. Accordingly, the front-rear directional dimension of each groove 12 becomes greater from the central portion 10 toward the left or right edge. Slant surfaces 15 and 16 are formed between the lug top surface 13 and groove bottom surface 14 formed at a predetermined depth from the lug top surface 13. The slant surfaces on the front side of the lug 24 are formed as planes 15 in which the slant angle becomes less toward the right and left edges. The slant surfaces on the rear side of the lug 24 are formed as planes 16 having a consistent slant angle from the central portion to the right and left edges.

Figure 12C:
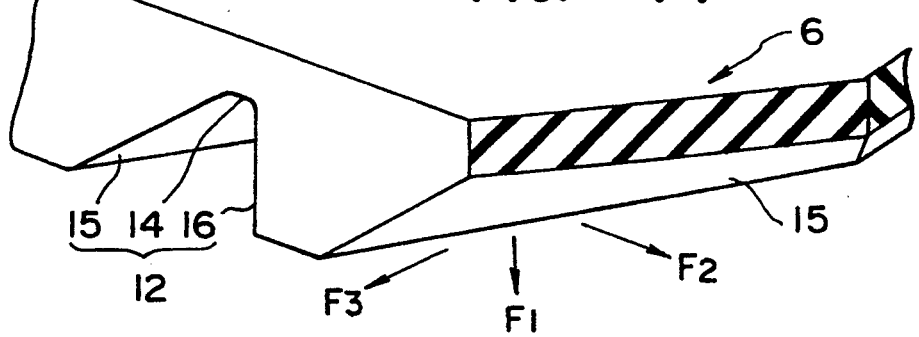
FIG. 12(c) illustrates the function of a front side slant surface formed between the front side of the lug and the bottom surface of a groove shown in FIG. 12(a)

FIG. 12(c) illustrates the function of a front side slant surface 15 formed between the front side of a lug 24 and a groove bottom surface 14. Generated are a force F1 which pushes the sheered soil clod downwardly from the rubber crawler belt 6, a force F2 which pushes the sheered soil clod backwardly and a force F3 which pushes the sheered soil clod outwardly. The forces F1 and F3 expand the area in which the soil pressure is generated by the driving force of the rubber crawler belt 6, providing the same effect as provided by a widened rubber crawler belt. The tractive power is thus increased. The force F1 acting downwardly causes a wedge effect in the downstream of the free wheels so that the lugs 24 will easily clutch into soil. When the rubber crawler belt slips, the force F1 and the force acting toward the outsides of the right and left edges push the soil clods outwardly and downwardly from the rubber crawler belt 6. Thus, soil hardly sticks in the grooves 12. The rubber crawler belt 6 easily releases soil.

Next, the fourth embodiment of the present invention will be described in detail with reference to the drawings.

Figure 7B:
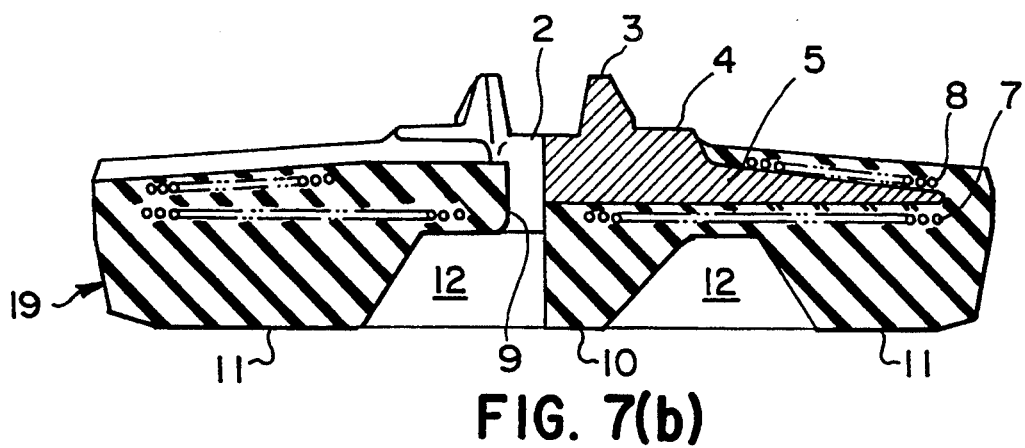
FIG. 7(b) is a sectional view taken along the line 7(b)—7(b) of FIG. 7(a).

As shown in FIG. 7(b), which is a sectional view of the rubber crawler belt 6 taken along the line 7(b)—7(b) of the FIG. 7(a), many steel core lines 7 are buried close to the bottom surface of core members 1 in a rubber crawler belt 6 and extend in the front-rear directions all through the rubber crawler belt 6. Further, many steel or synthetic resin core lines 8 are buried close to the top surface of core members 1 and extend in the front-rear directions all through the rubber crawler belt 6. The other structures are the same as in the first embodiment.

Figure 15A:
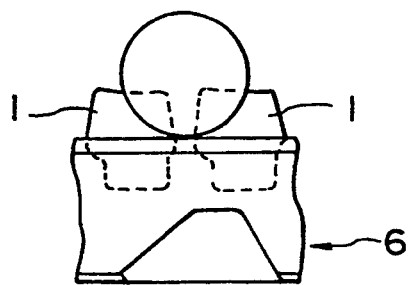
FIG. 15(a) illustrates a rubber crawler belt according to the present invention, with a lower roller positioned between core members of the rubber crawler belt.
Figure 15B:
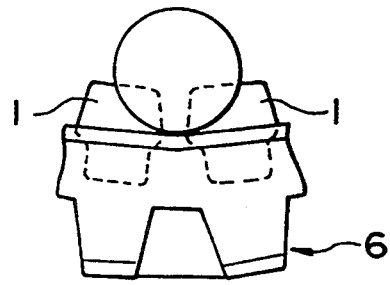
FIG. 15(b) illustrates a conventional rubber crawler belt with a lower roller positioned between core members of the rubber crawler belt.

Since the core lines 7, 8 are buried under and over the core members 1, when a tracked vehicle having rubber crawler belts 6 as described above is driven, the amount of tilt of the core members 1 caused when lower rollers roll across gaps between the core members 1 can be substantially reduced. Further, the bonding strength between the rubber of the crawler belt 6 and the core members 1 is enhanced. As a result, rigidity of the crawler belt 6 is enhanced, and partly because the right and left rolling rail surfaces 5 of the core members 1 are offset from each other in the front-rear directions, the amount of falling of the lower rollers into the gaps between the core members 1 is reduced from the falling amount in the conventional art as indicated in FIG. 15(b) to the falling amount in this embodiment as indicated in FIG. 15(a). The amount of vibrations is significantly reduced.

Further, the enhanced rigidity of the rubber crawler belt 6 substantially prevents the rubber crawler belt from twisting and going off track, and disperses the strain In the bending portions of the crawler belt, thus substantially preventing the crawler belt from flapping.

Though an example of the lugs provided on the ground contact surface of the rubber crawler belt 6 is described in this embodiment, other lug patterns within the spirit and scope of the claims may be used instead.

Next, the fifth embodiment of the present invention will be described in detail with reference to the drawings.

Figure 16:
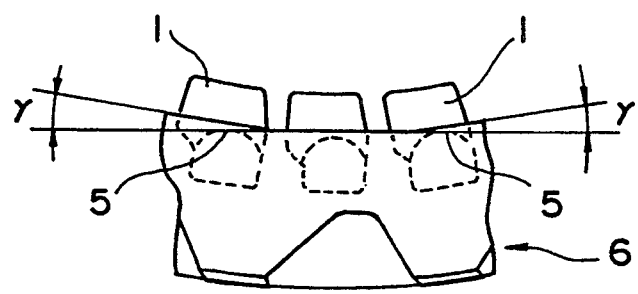
FIG. 16 is a partial side view of a rubber crawler belt being bent at a preset angle.

As shown in FIG. 16, a rubber crawler belt 6 is formed with a preset angle $\gamma$ so that rolling rail surfaces 5 of neighboring core members 1 will bend toward the roller-rolling side (the inside of the rubber crawler belt). It is preferable that the angle $\gamma$ be about 5. The other structures are the same as in the first embodiment.

As described above, the rubber crawler belt 6 is formed so as to remain bent even when bearing no load. Such a structure substantially prevents the rubber crawler belt 6 suspended between the drive wheels and the free wheels from flapping during travelling of the vehicle. Further, such a structure reduces the strain caused between the core members 1 in the rubber crawler belt 6 being wound around the drive wheel or the free wheel and, hence, reduces the force required for such winding. Therefore, travelling resistance is reduced, and reverse bending of the rubber crawler belt between the lower rollers or between the lower roller and the drive wheel is substantially prevented.

Next, the sixth embodiment of the present invention will be described with reference to the drawings.

Grooves 12 as shown in FIGS. 12(b) and 12(c) are formed in the lug pattern of a rubber crawler belt 6 as shown in FIG. 12(a). Core members 1 embedded in the rubber crawler belt 6 have a front-rear directional dimension B of the right and left wing portions 5 approximately equal to the front-rear directional dimension A of the engaging portions 2, which engage with the drive wheel, as shown in FIG. 7(a). As shown in FIG. 7(b), many steel or synthetic resin core lines 7, 8 are buried over and under the core members 1 in the rubber crawler belt 6 and extend in the front-rear directions all through the rubber belt 6. The rolling rail surfaces 5 of neighboring core members 1 are angled with a preset angle $\gamma$ so that the rubber crawler belt 6 will bend toward the roller-rolling side (the inside of the rubber crawler belt).

Such a structure provides advantages including the advantages of the first to fifth embodiments.

INDUSTRIAL APPLICABILITY

The present invention provides a short pitch crawler belt which engages with all the teeth of the drive wheel. A rubber crawler belt according to the present invention reduces vibrations and noise caused during travelling of the vehicle, enhances tractive power and rigidity of the crawler belt, and reduces abrasion of the lug and bending strain of the crawler belt, and hence may be suitably employed in a tracked vehicle, particularly in a construction machine such as a bulldozer or a hydraulic excavator.

I claim:

1. A rubber crawler belt for a tracked vehicle, wherein core members are embedded in said rubber crawler belt and arranged so as to engage serially with every tooth of a drive wheel, and engaging holes for engaging with said drive wheel are formed between neighboring core members and in a widthwise central portion of said rubber crawler belt, and at least one lug is formed on the ground contact surface of said rubber crawler belt so that at least a portion of one of said at least one lug extends across the right side portions of the projection planes of a plurality of adjacent core members and the gaps therebetween and at least a portion of one of said at least one lug extends across the left side portions of the projection planes of a plurality of adjacent core members and the gaps therebetween.

2. A rubber crawler belt for a tracked vehicle according to claim 1, wherein a portion of said at least one lug is formed so as to have a surface continuously extending all around said rubber crawler belt.

3. A rubber crawler belt for a tracked vehicle according to claim 1, wherein said at least one lug comprises a plurality of lugs, and each lug is composed of a central portion with respect to the width of said rubber crawler belt and branch portions extending from said central portion diagonally backwardly toward the right and left edges of said rubber crawler belt, and said branch portions cross each other at said central portion.

4. A rubber crawler belt for a tracked vehicle according to claim 1, wherein said at least one lug comprises a plurality of lugs, and each lug has a shape formed between two arcs having their centers in a widthwise central portion of said rubber crawler belt.

5. A rubber crawler belt for a tracked vehicle according to claim 1, wherein said at least one lug is composed of a plurality of belt-like lugs extending in the front-rear directions, said belt-like lugs being provided at the right and left edges of said rubber crawler belt and between said widthwise central portion and said right and left edges, and wherein said lugs provided between said widthwise central portion and said right and left edges are offset from said lugs provided at said right and left edges by one pitch of said core members.

6. A rubber crawler belt for a tracked vehicle according to claim 1, wherein said at least one lug comprises a plurality of lugs, and each lug is composed of a central portion with respect to the width of said rubber crawler belt, a right branch portion extending from said central portion diagonally upwardly toward the right edge of said rubber crawler belt and a left branch portion extending from said central portion diagonally downwardly toward the left edge of said rubber crawler belt, and wherein said right branch portion and said left branch portion are parallel to each other.

7. A rubber crawler belt for a tracked vehicle according to claim 1, wherein said at least one lug is composed of center portions provided between neighboring engaging holes and right and left branch portions extending from said center portions diagonally backwardly toward the right and left edges of said rubber crawler belt, said right and left branch portions being shifted from each other by one pitch of said core members, and wherein the front-rear directional dimension of lug top surfaces of said branch portions becomes less from a central portion toward the right and left edges of said crawler belt, and said center portions and said branch portions form a central portion having a "U" shape surrounding each engaging hole on three sides, and a lug top surface of said central portion continuously zigzags.

8. A rubber crawler belt for a tracked vehicle according to claim 7, wherein corresponding to the front-rear directional dimension of said lug top surfaces of said branch portions of said rubber crawler belt becoming less, the front-rear directional dimension of grooves formed between neighboring lug top surfaces becomes greater from said central portion toward said right and left edges of said rubber crawler belt, and slant surfaces are formed between said neighboring lug top surfaces and groove bottom surfaces formed at a predetermined depth from said neighboring lug top surfaces, and the slant surfaces on the front side of said lug are formed as planes in which the slant angle becomes less from the central portions toward said right and left edges, and the slant surfaces on the rear side of said lug are formed as planes having a consistent slant angle from the central portions to said right and left edges.

9. A rubber crawler belt for a tracked vehicle according to claim 8, wherein each of said core members embedded in said rubber crawler belt has an engaging portion for engaging with said drive wheel and which is provided in a central portion of the respective core member with respect to the width of said rubber crawler belt and has wing portions provided on the right and left sides of said engaging portion, and the front-rear directional dimension of said engaging portion is approximately equal to the front-rear directional dimension of said wing portions, and wherein a first plurality of core lines is provided close to the upper surface of each of said core members and a second plurality of core lines is provided close to the lower surface of each of said core members, with each of said first and second pluralities of core lines being embedded in said rubber crawler belt and extending in the front-rear directions, and said rubber crawler belt is provided with a preset angle so that rolling rail surfaces of neighboring core members will bend toward the roller-rolling surface.

10. A rubber crawler belt for a tracked vehicle according to claim 1, wherein said at least one lug is composed of a belt-like lug provided in a widthwise central portion of said rubber crawler belt and belt-like lugs provided on the right and left edges of said rubber crawler belt, and the belt-like lugs extend parallelly to one another in the front-rear directions of said rubber crawler belt.

11. A rubber crawler belt for a tracked vehicle according to claim 1, wherein said at least one lug is composed of a central portion with respect to the width of said rubber crawler belt and branch portions extending from said central portion diagonally backwardly toward the right and left edges of said rubber crawler belt, and said central portion is formed as a belt extending in the front-rear directions of said rubber crawler belt, and said branch portions cross each other at said central portion.

12. A rubber crawler belt for a tracked vehicle according to claim 1, wherein a first plurality of core lines is provided close to a lower surface of each of said core members and a second plurality of core lines is provided close to an upper surface of each of right and left portions of each of said core members, each of said first and second pluralities of core lines being embedded in said rubber crawler belt and extending in the front-rear directions of said rubber crawler belt.

13. A rubber crawler belt for a tracked vehicle according to claim 12, wherein the rubber crawler belt has a roller-rolling side, each of the left side portion and the right side portion of each core member is provided with a rolling rail surface and said rubber crawler belt is provided with a preset angle so that rolling rail surfaces of neighboring core members will bend toward the roller-rolling side.

14. A rubber crawler belt for a tracked vehicle, wherein core members are embedded in said rubber crawler belt and arranged so as to engage serially with every tooth of a drive wheel, and each of said core members has an engaging portion for engaging with said drive wheel and which is provided in a widthwise central portion of said core member between a left side portion of said core member and a right side portion of said core member, each of the right side portion and the left side portion being provided with a guide projection, a rolling rail surface and a wing portion, and wherein the front-rear directional dimension A of said engaging portion and the front-rear directional dimension B of said wing portions are approximately the same $$A \approx B;$$

wherein a first plurality of core lines is provided close to a lower surface of each of said core members and a second plurality of core lines is provided close to an upper surface of each of right and left wing portions of each of said core members, said first and second pluralities of core lines being embedded in said rubber crawler belt and extending in the front-rear directions of said rubber crawler belt; and wherein said rubber crawler belt has a roller-rolling side, and the rubber crawler belt is provided with a preset angle so that rolling rail surfaces of neighboring core members will bend toward the roller-rolling side of the rubber crawler belt.

15. A rubber crawler belt for use on a tracked vehicle having a drive wheel with teeth, said rubber crawler belt having a left edge and a right edge extending in the belt-winding direction, a first surface for contacting the ground, and a second surface opposite said first surface, said second surface being adapted to contact said drive wheel during operation of the tracked vehicle; said rubber crawler belt having a widthwise central portion at least substantially centrally located between said left edge and said right edge, said rubber crawler belt comprising a plurality of core members embedded in an endless rubber belt and extending widthwise of said endless rubber belt, said plurality of core members being arranged in said endless rubber belt so as to be able to serially engage the teeth of a drive wheel which is in contact with said second surface, each of said core members having a left wing portion and a right wing portion, a plurality of engaging holes for engaging with the teeth of the drive wheel, each of said plurality of engaging holes being formed in said widthwise central portion of the rubber crawler belt between a pair of neighboring core members, and at least one lug formed as part of said first surface with each one of said at least one lug extending across the projection planes of a plurality of adjacent core members and gaps between said adjacent core members.

16. A rubber crawler belt in accordance with claim 15 wherein the projection planes of the left wing portions of a pair of adjacent core members are crossed by at least one lug formed as part of said first surface and wherein the projection planes of the right wing portions of a pair of adjacent core members are crossed my at least one lug formed as part of said first surface.

17. A rubber crawler belt in accordance with claim 15 wherein each core member further comprises an engaging portion adapted to engage a drive wheel which is in contact with said second surface, said engaging portion being located between the right wing portion and the left wing portion of the respective core member with the front-rear directional dimension of the engaging portion being at least approximately the same as the front-rear direction dimension of the right wing portion and the left wing portion of the respective core member.

* * * * *